United States Patent
Friedrichs et al.

(10) Patent No.: US 9,218,461 B2
(45) Date of Patent: Dec. 22, 2015

(54) METHOD AND APPARATUS FOR DETECTING MALICIOUS SOFTWARE THROUGH CONTEXTUAL CONVICTIONS

(75) Inventors: Oliver Friedrichs, Woodside, CA (US); Alfred Huger, Calgary (CA); Adam O'Donnell, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/308,528

(22) Filed: Nov. 30, 2011

(65) Prior Publication Data

US 2013/0139261 A1 May 30, 2013

Related U.S. Application Data

(60) Provisional application No. 61/418,532, filed on Dec. 1, 2010, provisional application No. 61/418,514, filed on Dec. 1, 2010, provisional application No. 61/418,547, filed on Dec. 1, 2010, provisional application No. 61/418,580, filed on Dec. 1, 2010.

(51) Int. Cl.
    *G06F 21/56* (2013.01)
    *G06F 21/57* (2013.01)
    *H04L 29/06* (2006.01)
    *G06F 21/00* (2013.01)

(52) U.S. Cl.
    CPC ............ *G06F 21/00* (2013.01); *G06F 21/56* (2013.01); *G06F 21/577* (2013.01); *H04L 63/14* (2013.01)

(58) Field of Classification Search
    CPC ........ G06F 21/56; G06F 21/577; G04L 63/14
    USPC ............................................................ 726/23
    See application file for complete search history.

(56) References Cited

U.S. PATENT DOCUMENTS

| | | | |
|---|---|---|---|
| 7,010,696 B1 * | 3/2006 | Cambridge et al. ......... 713/188 |
| 7,103,913 B2 * | 9/2006 | Arnold et al. ................. 726/22 |
| 7,140,040 B2 * | 11/2006 | McBrearty et al. ............. 726/23 |
| 7,467,410 B2 * | 12/2008 | Graham et al. ................ 726/23 |
| 7,475,405 B2 * | 1/2009 | Manganaris et al. ......... 719/318 |
| 7,487,544 B2 | 2/2009 | Schultz et al. |
| 7,690,037 B1 | 3/2010 | Hartmann |
| 7,779,262 B2 | 8/2010 | Kim et al. |

(Continued)

FOREIGN PATENT DOCUMENTS

| | | |
|---|---|---|
| EP | 2199941 A2 | 6/2010 |
| EP | 2199941 A3 | 4/2012 |
| WO | 2010115959 A1 | 10/2010 |

OTHER PUBLICATIONS

International Search Report in International Application No. PCT/US2011/062957, mailed Apr. 4, 2012, 2 pages.

(Continued)

*Primary Examiner* — Dede Zecher
*Assistant Examiner* — Jason C Chiang (57) ABSTRACT

Novel methods, components, and systems that enhance traditional techniques for detecting malicious software are presented. More specifically, we describe methods, components, and systems that leverage important contextual information from a client system (such as recent history of events on that system) to detect malicious software that might have otherwise gone ignored. The disclosed invention provides a significant improvement with regard to detection capabilities compared to previous approaches.

23 Claims, 5 Drawing Sheets

(56) References Cited

U.S. PATENT DOCUMENTS

| | | | |
|---|---|---|---|
| 7,853,795 B2* | 12/2010 | Dick et al. ............... 713/178 |
| 7,945,957 B2* | 5/2011 | Dettinger et al. ............. 726/24 |
| 8,112,801 B2* | 2/2012 | Abdel-Aziz et al. ........... 726/22 |
| 8,127,358 B1* | 2/2012 | Lee ............... 726/24 |
| 8,136,149 B2* | 3/2012 | Freund ............... 726/11 |
| 8,161,548 B1 | 4/2012 | Wan |
| 8,214,899 B2* | 7/2012 | Chien ............... 726/23 |
| 8,266,698 B1 | 9/2012 | Seshardi et al. |
| 8,347,386 B2* | 1/2013 | Mahaffey et al. ............. 726/23 |
| 8,365,283 B1 | 1/2013 | Satish et al. |
| 8,566,947 B1* | 10/2013 | Sankruthi ............... 726/25 |
| 2004/0049698 A1* | 3/2004 | Ott et al. ............... 713/201 |
| 2006/0026675 A1 | 2/2006 | Cai et al. |
| 2006/0037077 A1* | 2/2006 | Gadde et al. ............... 726/23 |
| 2006/0037080 A1 | 2/2006 | Maloof |
| 2006/0126522 A1 | 6/2006 | Oh |
| 2006/0282660 A1* | 12/2006 | Varghese et al. ............. 713/155 |
| 2007/0016953 A1 | 1/2007 | Morris et al. |
| 2007/0150954 A1 | 6/2007 | Shon |
| 2008/0127336 A1* | 5/2008 | Sun et al. ............... 726/22 |
| 2008/0222717 A1* | 9/2008 | Rothstein et al. ............. 726/14 |
| 2009/0049549 A1 | 2/2009 | Park et al. |
| 2009/0064337 A1* | 3/2009 | Chien ............... 726/25 |
| 2009/0089869 A1 | 4/2009 | Varghese |
| 2009/0248696 A1 | 10/2009 | Rowles et al. |
| 2009/0254992 A1 | 10/2009 | Schultz et al. |
| 2009/0282476 A1* | 11/2009 | Nachenberg et al. ........... 726/22 |
| 2009/0300761 A1* | 12/2009 | Park et al. ............... 726/23 |
| 2009/0319659 A1 | 12/2009 | Terasaki et al. |
| 2010/0017877 A1 | 1/2010 | Cooley et al. |
| 2010/0058432 A1* | 3/2010 | Neystadt et al. ............... 726/1 |
| 2010/0100963 A1 | 4/2010 | Mahaffey |
| 2010/0169972 A1* | 7/2010 | Kuo et al. ............... 726/23 |
| 2010/0281248 A1 | 11/2010 | Lockhart et al. |
| 2011/0047620 A1 | 2/2011 | Mahaffey et al. |
| 2011/0208714 A1* | 8/2011 | Soukal et al. ............... 707/709 |
| 2012/0117648 A1* | 5/2012 | Kallio et al. ............... 726/23 |
| 2012/0124666 A1* | 5/2012 | Kim et al. ............... 726/23 |
| 2012/0158626 A1 | 6/2012 | Zhu et al. |
| 2012/0255004 A1* | 10/2012 | Sallam ............... 726/23 |
| 2012/0331556 A1* | 12/2012 | Alperovitch et al. ........... 726/23 |

OTHER PUBLICATIONS

Extended European Search Report in European Application No. 11844348.0, mailed Jun. 24, 2014, 8 pages.

* cited by examiner

METHOD AND APPARATUS FOR DETECTING MALICIOUS SOFTWARE THROUGH CONTEXTUAL CONVICTIONS

FIELD OF THE INVENTION

The present invention relates to the security of general purpose computing devices and more specifically to the detection of malicious software (malware) on a general purpose computing device.

BACKGROUND OF THE INVENTION

It is known in the art that each day, many tens of thousands of new malicious software programs are discovered. These programs can compromise the security of general computing devices. Possible security violations include, but are not limited to, the theft of data from the system, the usurping of the system for other nefarious purpose (like sending spam email), and, in general, the remote control of the system (by someone other than its owner) for other malicious actions.

One popular technique in the art for detecting malicious software comprises the following steps:
 a. Establishing through some independent means that the application is malicious (e.g., by having a human being manually analyze it and pinpoint the presence of one or more malicious behaviors).
 b. Computing a hash or fingerprint of this software. A hash is a mathematical transformation that takes the underlying binary contents of a software application and produces a relatively short string, with the idea being that two different applications will, with overwhelmingly high probability, have distinct fingerprint values. Common functions for performing this fingerprinting or hashing step include, but are not limited to, SHA-256, SHA-1, MD5, and others. Besides hash and fingerprint, another term used in the art to describe this transformation is a signature. For the purposes of this invention, the terms hash, fingerprint and signature will be used interchangeably. These terms are not synonymous with each other, but for the purposes of the invention described, the differences are immaterial.
 c. Publishing this hash so that it is accessible to end-users operating a general purpose computing device (for example, the hash can be posted to a blacklist of known malicious applications).
 d. Having the device compare this published fingerprint with the fingerprint of any new software applications that have arrived on the system.
 e. Applying a set of steps based on a given policy if the fingerprints match (e.g., blocking the installation of the application).

The technique just described suffers from the drawback that it only works when an application is determined to be malicious ahead of time. Put differently, it is a reactive approach. It is understood in the art that often times superficial changes to a malicious application will cause it to have a different fingerprint even though the underlying actions of the application continue to be malicious. In other words, the application will look ostensibly different from the outside, but underneath its operations will be identical (analogous to how a criminal can put on different disguises involving wigs and sunglasses, even though underneath it is the same person). If the file is modified, then the corresponding fingerprint might change. If the fingerprint changes, then it will no longer match the one that was initially established for the application, and consequently the application can potentially evade detection by any anti-malware technology that uses a reactive signature-based approach.

The recent explosion in malware instances appears to be a result of malware authors making frequent, but innocuous, changes to a smaller number of applications rather than creating entirely new applications. There is, accordingly, a need in the art to develop methods, components, and systems for proactively detecting malicious software in a way that addresses the above limitations. The present invention addresses these needs by using contextual information, such as the presence of other recent (malicious) activity on a system, to formulate a more accurate picture regarding whether or not a particular software application running on the system might be malicious.

SUMMARY OF THE INVENTION

The following invention summary describes an overall system for identifying malicious files through additional contextual analysis, as well as individual components and methods that are included in such a system. These components are distinct inventions in their own right.

According to one aspect of the present invention, a system is provided that uses contextual information from a client system together with more aggressive detection engines to determine if a given software application is malicious. The system comprises the following phases. First, a client encounters a software application for which it would like to know a disposition—that is whether the application is benign or malicious. The client extracts metadata about the application, including but not limited to, traditional fingerprints (like a SHA-256), generic signatures such as those used in the art by many Anti-Malware technologies, machine learning feature attributes, etc. The client also gathers additional contextual information. For example, recent infection history, applications running on the system, web sites visited, etc. This information is encoded, as appropriate, using any technique known in the art. Next, the information about the application as well as the contextual information is transmitted (if necessary over a network) to a server component. (This component need not be a remote server; instead the logic can reside on the client itself. To clarify the description, however, it helps to imagine a separate component that processes information transmitted by the client.) The server examines both the contextual information as well as the application information and makes a determination about the application (for example, that the application is safe to run). The server provides a response back to the client that encodes a recommendation for what the client should do. Finally, the client determines what actions to take, according to local policy, as a function of the server's.

According to another aspect of the present invention, a client component is provided that continuously gathers contextual information, optionally transmits this information to a server, and makes a determination with the possible help of a server about whether a given software application poses a threat. The determination utilizes traditional techniques for identifying a threat together with the contextual information. The contextual information may include, but is not limited to, applications recently installed on the system, information about recent threats found on the system as well as when those threats were found, any recent web sites the client visited, geographic location as well as Internet Protocol (IP) address of the client, and a client identifier. The client identifier is a sequence of symbols that can be used to identify a client for the purposes of being able to link different transactions by the same client from the perspective of a server.

According to another aspect of the present invention, a component is provided that can reside on either a client or a server, and includes logic that uses contextual information passed by the client to determine whether a given software application is malicious. The server can also use additional contextual information that can be gathered from a plurality of clients, such as the frequency and timing with which an application of interest is queried by other clients as well as the context of that application as described by other clients. Once that determination is made, a corresponding recommendation is determined, and is transmitted to the client.

According to another aspect of the present invention, the underlying method (executed on the client system) gathers contextual information from a client to assist in determining if a given software application of interest is a threat. Examples of underlying information include recent security events on the client (such as the detection of other malicious software or malware) or the presence of particular "risky" software applications on the system (such as peer-to-peer file sharing applications).

According to another aspect of the present invention, a method is provided that examines data about a given software application of interest together with contextual information associated with that application on a user system, and makes a determination about that application (such as whether the application is malicious and should be blocked or removed). The method might use a set of simple rules. For example, if the system has seen 10 threats in the last hour, and the present application has a 65% chance of being malicious based on another threat detection system, (e.g., one derived using machine learning techniques, or one using generic signatures), then determine the application is malicious (with the idea being that in the absence of any other information, having only a 65% chance of being right is typically insufficient to make a conclusive determination, but that with the addition of contextual information of 10 recent threats, the likelihood that the application is malicious is much greater). The method might also employ machine learning techniques to generate either a set of rules or generate a more generic model that effectively encodes additional rules.

DESCRIPTION OF THE DRAWINGS

The subsequent description of the preferred embodiments of the present invention refers to the attached drawings, wherein.

DETAILED DESCRIPTION OF THE INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These descriptions and representations are the means used by those skilled in the data processing arts to most effectively convey the substance of their work to others skilled in the art. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The descriptions presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The description that follows will reference terminology that is generally known in the art. In the art, the term malware refers to a malicious software application. Such an application can have a number of nefarious purposes. For example, malware can be used to perform a number of malicious actions. These actions include, but are not limited to: stealing digital information from a victim's machine; using the victim's machine in the perpetration of other malicious activities (such as sending out unsolicited email messages or spam); remotely control the victim's machine; and inhibiting the machine from operating normally. In the art, a computer virus is generally considered one example of malicious software. In addition to computer viruses, other types of malware in the art include Trojans, Worms, Downloaders, and Misleading Applications.

It is understood that the maliciousness of an application can be subjective; it often depends on the user and typically includes a well-defined set of rules. For the purposes of this disclosure, a malicious application shall be understood to mean an application that is unwelcome to the user.

In the art, the term false positive references a situation in which an otherwise legitimate application is accidentally deemed malicious. Similarly, a true positive references a situation in which a malicious application is correctly identified as such. The false positive rate represents the likelihood that a legitimate application will be incorrectly called malicious by an anti-malware technique. The true positive rate represents the likelihood that a malicious application will be correctly called malicious by an anti-malware technique. It is therefore the objective of anti-malware software to achieve a high true positive rate while having a low false positive rate. In the art, the true positive rate is also referred to sometimes as the detection rate. It should be borne in mind, however, that the true positive and false positive rates are generally approximated using a data sample.

In the art, the term signature references a relatively short sequence of values that can be used to identify if an application is malicious or not. In its most general incarnation, the signature is computed as a transformation applied to an entire software application. In the art, a signature is typically computed on a known piece of malware. The signature is either transmitted onto a client's system or it is stored on a server. When a client encounters a new piece of software, it will compute a signature on that software, and determine if that signature matches one associated with a known piece of malicious software either by checking its local data store or by querying a server. It is understood in the art that a signature can either be specific or generic. If two software applications have the same specific signature, then with overwhelming likelihood, these two applications are entirely identical. One example of a specific signature in the art is a SHA-256 hash.

A generic signature permits that possibility that variations on a given application will continue to have the same signature. If an application is taken, and superficial changes are made to it, then the generic signature on this application might continue to be the same as the original whereas a specific signature on it will with extremely high likelihood be different from that computed on the original. One example of a generic signature in the art is the PEhash. Another example of a generic signature in the art is ssdeep.

A fingerprint is one example of a traditional signature and a fuzzy fingerprint is one example of a generic signature. In the art, the term conviction refers to a situation in which a piece of software is identified as malicious on a client system.

In the art, the term digital signature refers to a standard technology for computing a relatively short string from a file using techniques from the field of public-key cryptography. The transformation to compute the string from the file requires the use of a so-called private signing key. A public verification key can be used to determine if a purported signature on a file has been correctly computed. A secure signature scheme is such that without knowledge of the private signing key, it is computationally infeasible for one to compute a signature that will be construed as valid. A digital signature should not be confused with the types of signatures mentioned above for detecting malicious applications (even though in the art these notions all use the term "signature").

The following description will also reference terminology from the field of machine learning, and is known to those skilled in the art. In its simplest form, machine learning techniques can be used to classify objects into one of a plurality of sets. Within the context of anti-malware solutions, machine learning techniques would be used to identify whether a given software application is likely to be malicious or benign, and potentially produce a score that reflects the confidence in that classification. To avoid obscuring the details of the invention, in the following, the nomenclature associated with machine learning techniques will be described in reference to their application towards the classification of software applications as being either malicious or benign. Machine learning approaches first tend to involve what is known in the art as a "training phase". In the context of classifying software applications as benign or malicious, a training "corpus" is first constructed. This corpus typically comprises a set of software applications. Each application in this set is optionally accompanied with a "label" of its disposition, for example "benign", "malign", or "unknown". The labels can be determined either through manual analysis or through some other independent and possibly more expensive means. It is desirable to have fewer unknown samples, though at the same time is understood in the art that labeled data may be more expensive to obtain.

Furthermore, it is desirable for the corpus to be representative of the real world scenarios in which the machine learning techniques will ultimately be applied. For example, in the context of classifying software applications, it might be desirable if the applications in the corpus are reflective of what might be found on a typical end-user computer system and specifically be reflective of the files on that system that will be classified using machine learning techniques. In the first phase of the training process, a feature vector is extracted from each software application. A feature vector is a series of values that represent the salient features of a software application in the corpus. The expectation is that these values are especially relevant for identifying whether the application is more likely to be malicious versus benign.

For example, one feature value might be a single binary digit (0 or 1) representing whether the file is digitally signed. This feature might be relevant since in practice illegitimate applications are infrequently digitally signed. Another relevant feature might be the size of the file containing the software application. This feature might be relevant since malicious applications tend to have a smaller size than benign ones. It is important to note that any single feature might not yield any conclusive evidence over whether an application is malicious or benign, but examining a plurality of such feature values could provide conclusive evidence. It is also important to note that in many instances the kind of features to use in a machine learning system is often determined through specific domain expertise rather than being derived through entirely automated means. For example, it might require domain expertise to determine that knowing whether a file is digitally signed is valuable information.

Once feature vectors are extracted from the training corpus, then these vectors, together with the labels associated with any of the files themselves, are fed into an algorithm that implements the "training phase." The goal of this phase is to automatically derive a "model". A model effectively encodes a mathematical function whose input is a feature vector and whose output is a classification. In the context of using machine learning to detect malware, the output of the model might be a binary label of either "benign" or "malign". Certain machine learning models are also capable of producing a score that reflects the confidence in the label. For example, the output might be an encoding of the form ("malign", 0.95) which can be taken to mean that the model believes that the feature vector has a 95% chance of corresponding to a malicious software application. A machine learning algorithm should ideally produce a classifier that is reasonably consistent with the labels provided in the training examples and that has a reasonable likelihood of generalizing to new instances. Generalization is important since it is expected that in practice the model will be evaluated on instances whose dispositions are not already known.

Specific machine learning algorithms in the art include the Naive Bayes Algorithm, Artificial Neural Networks, Decision Trees, Support Vector Machines, Logistic Regression, Nearest Neighbors, etc. The term classifier is also used to describe a model. For example, one may refer to a Support Vector Machine classifier. Once the classifier/model is established, it can be used to evaluate new instances of software applications that are presented to the computer or computer network in practice.

In the context of detecting malware, a client system would first extract the feature vector associated with a software application and then apply the model to that feature vector to obtain a disposition and optionally a confidence value. Finally, it would apply a policy based on this information. The actual classification process need not happen locally on the client. Instead, it could be performed on a remote server, in which case it is expected that the client will transmit an encoding of the feature vector to the server. The server would, in turn, apply evaluate the feature vector using the classifier and make a corresponding determination about whether the application of interest is good or bad. The policy associated with the final classification could be complex if the classification also includes a confidence value. For example, if a system is highly critical or holds very sensitive information, then an application might be blocked unless there is a high likelihood of it being benign. On the other hand, if the system is not as sensitive then, the converse stance can be taken. Specifically, only applications that have a high likelihood of being malicious would be blocked.

For the purposes of the disclosed invention, it will be helpful to distinguish between two sets of applications running on a client system. The term "applications of interest" are used to refer software applications that reside on a client system or are about to reside on a client system, and where the user or an Anti-Malware component on the client system is interested in the disposition of these applications. Aside from applications of interest, this disclosure references other types of software applications, for example, a software application that might be running while the application of interest is running Such a software application might include, but not be limited to, a web browser, a Peer-to-Peer file sharing client, a Banking Application, or a PDF reader. If a Peer-to-Peer file sharing application is running while an application of interest is running, that might point to a slightly increased likelihood that the application of interest is malicious, since malicious applications are often transmitted via Peer-to-Peer networks.

Along similar lines, if a banking application is running, then regardless of whether the application of interest is malicious, it might make sense to block it or otherwise suspend its operations since even if there is a small risk that the application of interest is malicious, the risk would not be worth the cost of having financial data compromised or stolen. It should be borne in mind that these considerations are simply signals associated with the likelihood that the application of interest is malicious. Taken individually, these signals are likely not enough to warrant taking action against the application. However, a plurality of such signals together with information about the application of interest can provide more conclusive evidence as to whether or not the application has malicious intent. By viewing these signals as attributes in a feature vector, machine learning methods can also be applied to these signals.

According to one embodiment of the present invention, the client and server components would function as follows. When a client encounters a software application that it would like to classify as either malicious or benign, it would gather both data about the application that is used for traditional detection of malware together with contextual data about the system. The data gathered could include, but is not limited to, recent infection history on the system, the geographic location of the client, the Internet Protocol or IP address of the client, the virus identifiers and times associated with recent infections, and a client identifier that can be used to link transactions made by the same client on multiple occasions.

The infection history can be gathered either by a custom agent or by a third-party agent that exposes infection events. The client would transmit both traditional data about the application as well as contextual information. The data can be transported in a raw fashion or could be encoded in a way that permits efficient transmission over a network. The choice of encoding mechanism is orthogonal to the main aspects of the present invention and there are many techniques in the art for encoding data. The server receives data from the client and makes a determination about whether the application is malicious. If the application is deemed malicious or benign through traditional means like a signature that appears on a whitelist or blacklist, then the determination can be made without reference to the additional context passed by the client. If the application is suspicious on the basis of the data being sent, but not suspicious enough to warrant calling it outright malicious, then the contextual information can be considered. In one embodiment, if an application is suspicious and the machine had one or more recent infections, then the server can make a determination that the application is malicious. Once the server provides its recommendation, this information is passed back to the client, which in-turn, can apply a policy based on that recommendation. In one embodiment, if the server deems the application as malicious then the client can delete it from the system or otherwise block its installation onto the system. In a different embodiment, the client can block the application if the machine is in a more security sensitive state. For example, if the machine is currently running sensitive software like a banking application, then it is in a more security sensitive state (since a compromise could lead to direct financial loss). In this case, the client can block software that is suspicious (but not confirmed as malicious) from executing until the banking application has finished executing.

According to another embodiment of the present invention, a client-side component gathers information relevant to making a contextual conviction. In one embodiment, the client side component would simply provide a client identifier to the server. The client can optionally send one or more of the following pieces of information: a list of recent infections together with timestamps and virus identifiers associated with those infections; information about web sites the client visited recently; information about applications running on the system; information about applications installed on the system; information about which network ports are opened on the system; the client's geographic location; the clients Internet Protocol or IP address. In one embodiment, this component could be running constantly in the background collecting information and transmitting at periodic intervals to the server or transmitting it whenever an application of interest is encountered. In a varying embodiment, this component could collect information at the time that it is needed. In yet another embodiment, this component would combine information collected in the background as well as information collected at the time of interest.

According to another embodiment of the present invention, a server-side component analyzes information about an application in addition to contextual information about the machine that encountered application, and uses that information to make a determination regarding whether the application is malicious. In one embodiment, the server might choose to upgrade an otherwise suspicious application to a malicious application if the context in which it came increases the prior probability that the application is malicious. In another embodiment, a suspicious application might be deemed malicious if a recent infection were seen on the system. Although the embodiment just described involves making this determination on the server, the logic itself could be executed on the client or on some combination of the client or the server. In one embodiment, the server can reference the client's identifier as provided by the client, and use that identifier to mine the history of the client's transactions with the server. This information can be used to add context to the decision. For example, if the client had a recent transaction with the server where an application of interest that it queried about turned out to be malicious, then the server can treat that as a situation in which the prior probability that an application is malicious probability has gone up. In another embodiment, the server can use contextual information gathered from a plurality of clients. In this case, the server can use information that includes, but is not limited to the frequency with which a particular application is queried and the contexts from other clients associated with those queries.

According to another embodiment of the present invention, a method is executed on a client system for collecting contextual data that pertains to helping identify whether an application is malicious or benign. The method comprises the following steps, each of which is optional. First, obtain a client identifier that can be used to associate transactions from the same system. In one embodiment, this identifier can be a Global Unique Identifier (or GUID). In an alternate embodiment, this identifier can be constructed by a server at the time the client is initialized and passed to the client. The client, in-turn, would store this data in some form of non-volatile storage. Second, record any malicious threats identified either using a custom agent or using a third-party agent that have been identified on the system together with information about the time those threats entered the system. In the context of Anti-Malware technology, threats can be identified by a Virus ID, a generic fingerprint, a SHA-256, or some combination thereof. Typically, a Virus ID would yield the most generic labeling of the threat and a SHA 256 would yield the most specific labeling (identifying only that one threat). A generic fingerprint would provide a level of specificity in between these two ends. Third, record any web sites the user has visited. Fourth, record any software applications the user installed within a specified time window. Fifth, record any applications that were running at the time the application of interest (that is, the application whose disposition we are interested in) was introduced. Sixth, capture information about the client's Internet Protocol (or IP) address. Seventh, capture information about the client's netblock. Eight, capture information about the client's geographic location. Ninth, capture information about the language being used on the client system. Tenth, capture information about the network ports open on the system. Eleventh, capture information about what applications are running on the system. Twelfth, capture information about how the application of interest arrived on the system. This information includes, but is not limited to, the software application it might have arrived through, such as a web browser; the location the file came from, such as from a web site, a CD Rom, or a USB drive. Thirteenth, what rights the application of interest is looking to obtain, such as whether it would like to run under administrative privileges. Fourteenth, the web sites that the user is currently browsing when queried about the application of interest. Fifteenth, the current state of the application, such as whether the application is executing on the system or whether it is dormant. It should be borne in mind that not all of these pieces of information are compulsory, and that they may even be redundant. The list is included to elucidate the different aspects of the invention. For example, if the client sends just an identifier together with data about the application of interest to the server, then the server can use knowledge of the client's previous transactions and previous requests for applications of interest to formulate contextual information. In particular, the server can determine which applications of interest the client queried for previously, when it queried for those applications, which of those applications were deemed to be malicious, and if applicable what threats those applications corresponded to. From this information, the client's infection history can be constructed. Similarly, the server can obtain information about the client's Internet Protocol address and, as a result, information about the geographic location of the client, but using information included as part of the network protocol used by the client to communicate with the server. Specifically, if the protocol used were the Transmission Control Protocol/Internet Protocol (TCP/IP), then the Internet Protocol address is automatically included.

According to another embodiment of the present invention, a method is provided for using contextual information together with relevant metadata about an application of interest to make a final determination about whether that application is malicious or benign. The method comprises the following steps. First, a traditional evaluation of the application of interest is performed. If the application is deemed conclusively benign or conclusively malicious, then this information, together with a recommendation can be provided to the client. If the application's disposition is unknown, the gathered data about the application as well as the contextual information provided is analyzed. In one embodiment, if the gathered data as well as the contextual information can be used as a feature vector for a machine learning system, then the results of the machine learning classifier can be applied. To label the examples in such a corpus, one might have to appeal to either traditional techniques or to manual analysis of the executables. However, this process is suggested as a way to "jumpstart" the operations. The labeling of examples for the building of a training corpus can be done in any number of ways known to persons of ordinary skill in the art. Once a sufficient number of feature vectors have been labeled in conjunction with a file, a machine learning classifier can be trained. The result would be a "model" that can then be applied to new (unclassified) instances. The disclosure of co-pending application Ser. No. 13/308,533 (now U.S. Pat. No. 8,875,286), filed concurrently herewith, entitled Method and Apparatus for Detecting Malicious Software Using Machine Learning Techniques is hereby incorporated by reference in its entirety.

According to another embodiment, if the gathered data indicates that the application is suspicious and the machine has a recent history of infections, the application can be deemed malicious. In another embodiment, if the contextual information suggests that the machine's security position is compromised, then more aggressive detection capabilities can be applied.

These detection capabilities can include, but are not limited to, the following: generic fingerprints of malicious applications that catch variations of threats, but that may be more prone to false positives; aggressive machine learning classifiers that can catch threats based on generic characteristics; and fingerprints of software samples that are likely to be malicious, but which have not been scrutinized yet. Contextual information that may be indicative of a machine's security position being compromised can include, but is not limited to, the following: recent infections on the system; visiting web sites that have been discovered to be compromised (where a list of such sites as well as techniques for identifying such sites are orthogonal to the disclosed invention); and installing software applications that are considered risky, such as a peer-to-peer file sharing client. In addition, some contextual information can be useful in determining if a machine is potentially at risk of being compromised. Such contextual information can include, but is not limited to the following: the presence of software applications that have known security vulnerabilities; and the presence of software applications, such as web browsers, that can be used as a conduit by attackers wishing to download threats onto the system. In another embodiment, if the contextual data suggests that a security sensitive application, such as a banking application, is running on the system, then a recommendation can be made to suspend the application of interest temporarily if it is deemed even remotely suspicious. The premise is that under such circumstances, the risk of a false positive is tolerable given the cost of becoming potentially compromised. In another embodiment, if the contextual information indicates a client is coming from or operating in a specific geographic region, then detection capabilities associated with threats from that region can be applied. For example, the Bancos Trojan is a known malware threat that targets users in Brazil (specifically focusing on stealing information associated with Brazilian bank accounts). If the computer system being protected is located in Brazil, a more aggressive technique for identifying Bancos can be applied. This technique could be, for example, a machine learning classifier that was trained specifically to identify Bancos. In a related embodiment, if the contextual information indicates that the user visited specific web sites, then aggressive techniques that identify threats associated with those web sites can be applied. As in the foregoing example, if a user visits a banking web site that coincides with the list of targets of the Bancos Trojan, then detection capabilities can be applied for Bancos. Along similar lines, if a user visits a site like Facebook, then detection capabilities for a threat like the Koobface worm can be applied.

Figure 1:
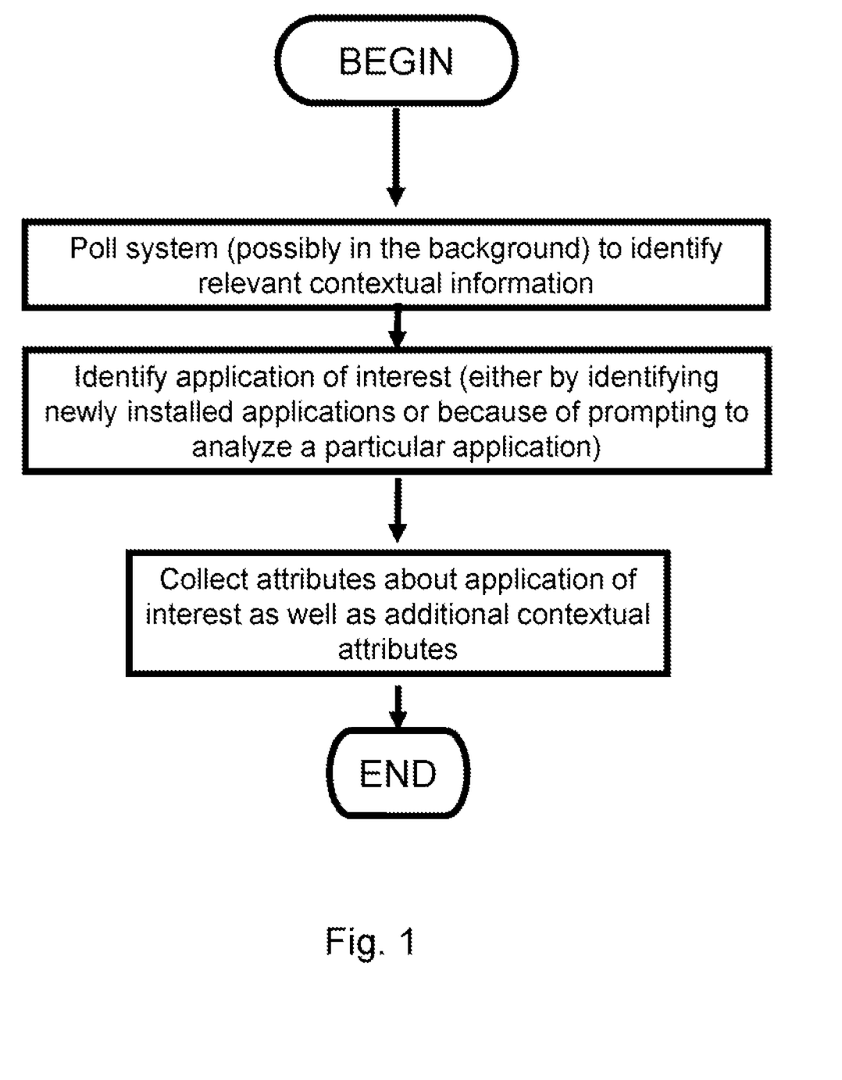
FIG. 1 is a flowchart representing steps in a method for collecting contextual attributes for the purposes of identifying if an application of interest is malicious according to an embodiment of the invention.
Figure 2:
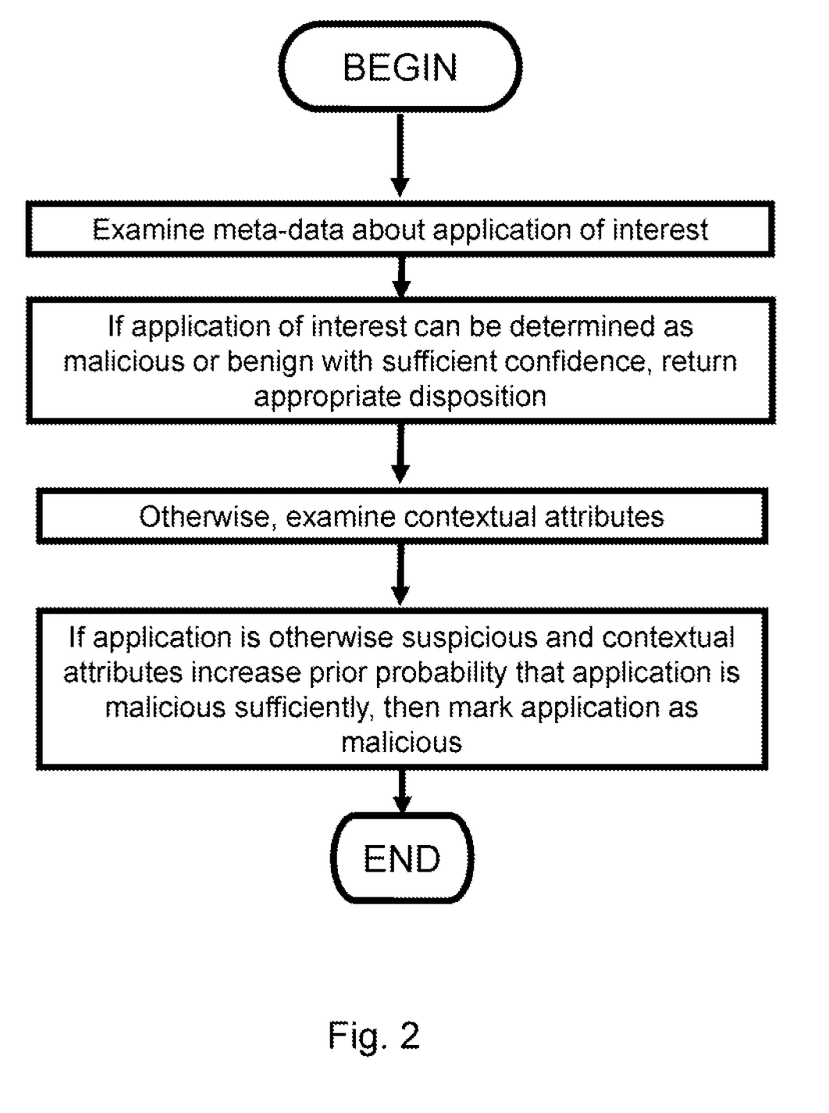
FIG. 2 is a flowchart representing steps in a method for using contextual attributes to identify malicious applications according to an embodiment of the invention.
Figure 3:
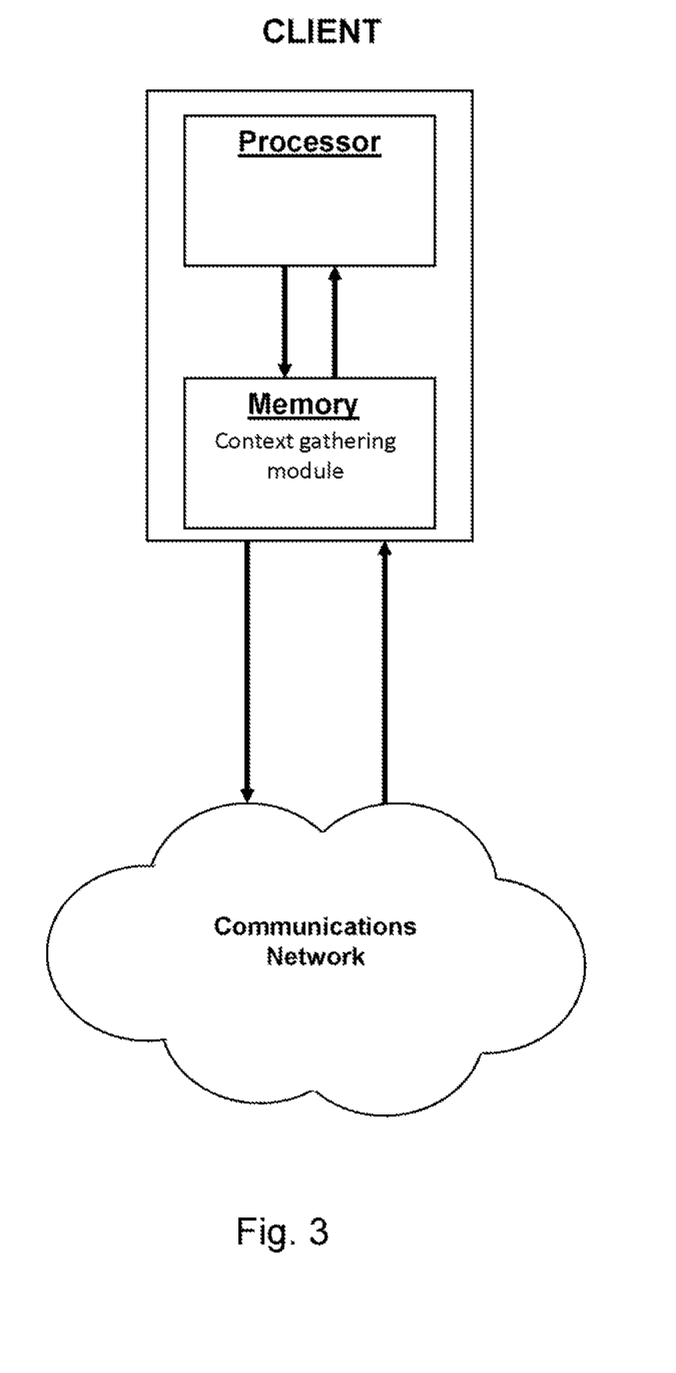
FIG. 3 is a representation of a client component including a context gathering module according to an embodiment of the invention.
Figure 4:
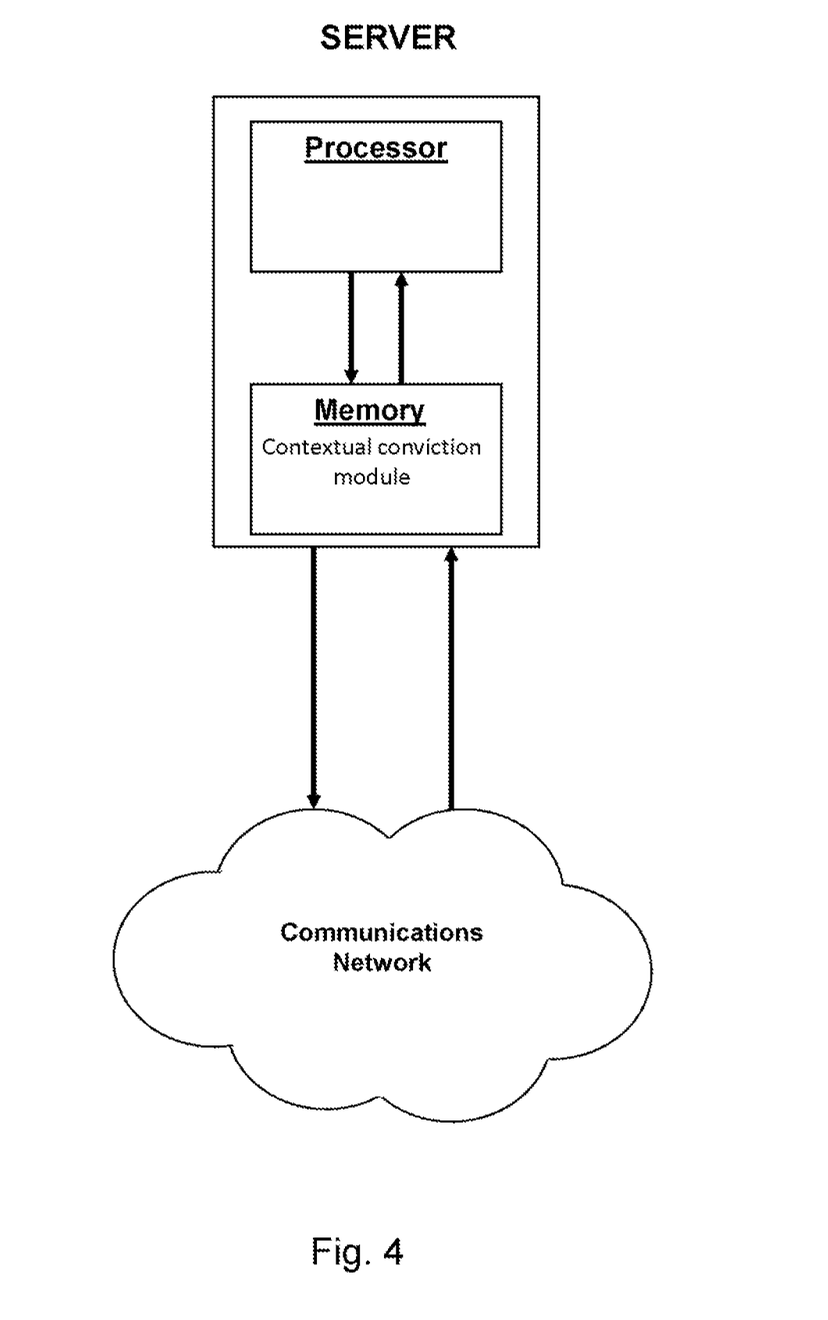
FIG. 4 is a representation of a server component including a contextual conviction module according to an embodiment of the invention.
Figure 5:
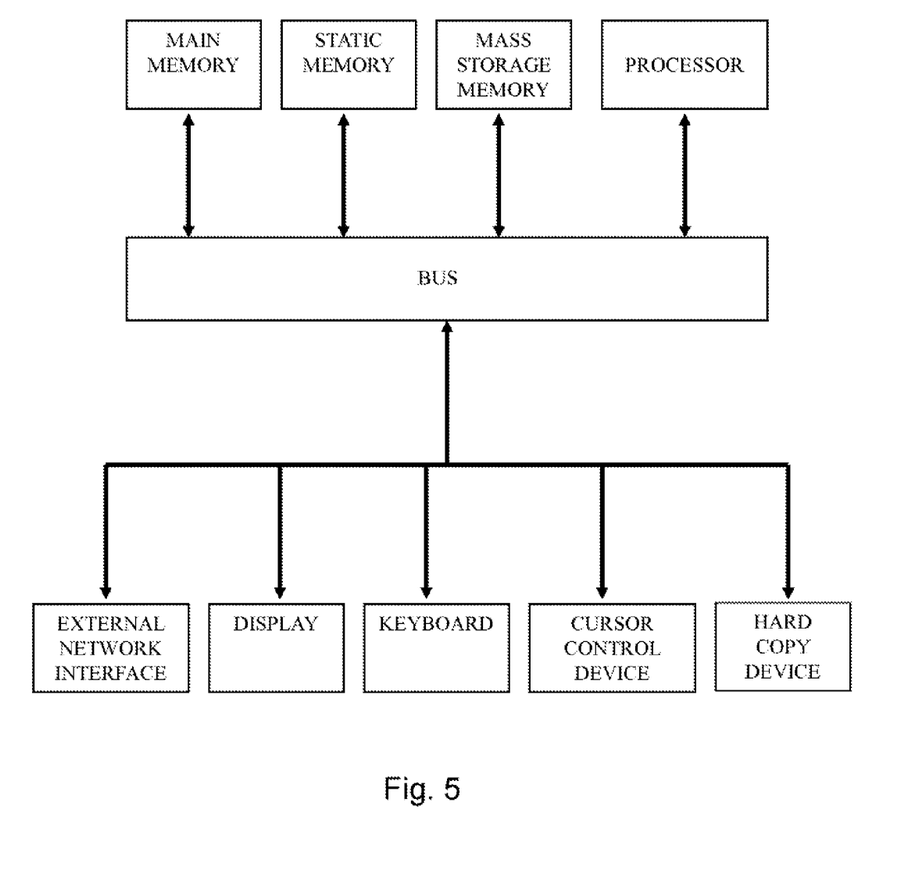
FIG. 5 is a representation of an exemplary computer system according to an embodiment of the invention.

FIG. 5 is a block diagram of an exemplary computer system that may perform one or more of the operations described herein. The computer system may comprise an exemplary client or server computer system. The computer system comprises a communication mechanism or bus for communicating information, and a processor coupled with a bus for processing information. The processor includes a microprocessor, but is not limited to a microprocessor, such as, for example, Pentium, PowerPC, Alpha, etc. The system further comprises a random access memory (RAM), or other dynamic storage device (referred to as main memory) coupled to the bus for storing information and instructions to be executed by the processor. Main memory also may be used for storing temporary variables or other intermediate information during execution of instructions by the processor.

The computer system may also comprise a read only memory (ROM) and/or other static storage device coupled to the bus for storing static information and instructions for the processor, and a data storage device, such as a magnetic disk or optical disk and its corresponding disk drive. The data storage device is coupled to the bus for storing information and instructions. The computer system may further be coupled to a display device, such as a cathode ray tube (CRT) or liquid crystal display (CD), coupled to the bus for displaying information to a computer user. An alphanumeric input device, including alphanumeric and other keys, may also be coupled to the bus for communicating information and command selections to the processor. An additional user input device is cursor control, such as a mouse, trackball, trackpad, stylus, or cursor direction keys, coupled to the bus for communicating direction information and command selections to the processor, and for controlling cursor movement on the display. Another device that may be coupled to the bus is a hard copy device, which may be used for printing instructions, data, or other information on a medium such as paper, film, or similar types of media. Furthermore, a sound recording and playback device, such as a speaker and/or microphone may optionally be coupled to the bus for audio interfacing with the computer system. Another device that may be coupled to the bus is a wired/wireless communication capability to communication to a phone or handheld palm device.

Note that any or all of the components of the system and associated hardware may be used in the present invention. However, it can be appreciated that other configurations of the computer system may include some or all of the devices.

EXAMPLE 1

This example is intended to illustrate one aspect of the invention to help clarify the invention by walking through one possible implementation. It should not be viewed as limiting the scope of the invention in any way.

Agent software (part of the invention) is running on a client system (e.g., a laptop or desktop PC). The software monitors for the presence of security-related events. For example, the agent software might implement a Microsoft Windows minifilter driver that monitors file access. Whenever a new file is created on the file system, it will analyze that file to see if it is malicious using traditional techniques (such as blacklisting). This process can take place by querying a remote service hosted elsewhere (e.g., a "Cloud-based" service).

On the back end, whenever such a query is received, several methods can be applied to determine if the application is malicious. These methods can involve heuristic approaches as well as blacklisting approaches. If a file is determined to be conclusively malicious (without needing any more evidence), the result can be returned back to the client (and the transaction can be logged for future processing).

If the file is not conclusively malicious, but is still suspicious (e.g., based on heuristics the file has a 70% chance of being malicious), then additional contextual information is examined. For example, if the system on which this file resides has recently installed a peer-to-peer file sharing client and has had three conclusively malicious files in the last day, then the new file may be labeled as conclusively malicious (instead of just treating it as suspicious).

The main idea is to leverage the additional context of recent infections on the system to help tip the scales. In this case, the rule was fairly simple (3 recent infections and the installation of a peer-to-peer file sharing application). However, more sophisticated rules could be applied. Moreover, machine learning techniques can be used to create rules (or models that effectively encode rules).

Whereas many alterations and modifications of the present invention will no doubt become apparent to a person of ordinary skill in the art after having read the foregoing description, it is to be understood that any particular embodiment shown and described by way of illustration is in no way intended to be considered limiting.

The invention claimed is:

1. A computer-implemented method for making a determination concerning whether a software application is benign or malicious comprising:
    extracting metadata about the application;
    gathering a first set of contextual information concerning the system to generate a constructed infection history for a client, wherein said first set of contextual information includes recent infection history, applications running on the system, web sites visited, the geographic location of the client, the Internet Protocol (IP) address of the client, and a client identifier;
    transmitting the metadata and the first set of contextual information to a server component, wherein the metadata and the first set of contextual information are encoded prior to the transmitting;
    making a determination as to whether the application is benign or malicious by:
        examining the metadata and determining that the application is suspicious; and
        when the application is suspicious and a final determination as to whether the application is benign or malicious cannot be made without analyzing the first set of contextual information, examining the metadata based on the constructed infection history, including analyzing the metadata based on geographic parameters and web site specific parameters determined based on the constructed infection history, to determine whether the application is benign or malicious;
    deriving a model based on the determination, the model encoding rules to be utilized in making future determinations when a second set of contextual information is similar to the first set of contextual information;
    transmitting a response to the client containing information relating to the determination; and
    making a determination as to whether to take any action concerning the application based on the information from the server component.

2. The method according to claim 1, wherein said extracted metadata is selected from the group consisting of traditional fingerprints and generic signatures.

3. The method according to claim 1, wherein said server component and said client reside on the same computing device.

4. The method according to claim 1, wherein said server component and said client reside on separate and remote computing devices.

5. The method according to claim 1, wherein said client continuously gathers contextual information, the first set of contextual information being from a first period of time and the second set of contextual information being from a second period of time.

6. Non-transitory computer-readable storage medium containing computer readable instructions operable to make a determination concerning whether a software application is benign or malicious, said instructions comprising instructions operable to:
    extract metadata about the application;
    gather a first set of contextual information concerning the system to generate a constructed infection history for a client, wherein said first set of contextual information includes recent infection history, applications running on the system, web sites visited, the geographic location of the client, the Internet Protocol (IP) address of the client, and a client identifier;
    transmit the metadata and the first set of contextual information to a server component, wherein the metadata and the a first set of contextual information is encoded prior to the transmitting;
    make a determination as to whether the application is benign or malicious by:
        examining the metadata and determining that the application is suspicious; and
        when the application is suspicious and a final determination as to whether the application is benign or malicious cannot be made without analyzing the first set of contextual information, examining the metadata based on the constructed infection history, including analyzing the metadata based on geographic parameters and web site specific parameters determined based on the constructed infection history, to determine whether the application is benign or malicious;
    derive a model based on the determination, the model encoding rules to be utilized in making future determinations when a second set of contextual information is similar to the first set of contextual information;
    transmit a response to the client containing information relating to the determination; and
    make a determination as to whether to take any action concerning the application based on the information from the server component.

7. The non-transitory computer-readable storage medium according to claim 6, wherein said extracted metadata is selected from the group consisting of traditional fingerprints and generic signatures.

8. The non-transitory computer-readable storage medium according to claim 6, wherein said server component and said client reside on the same computing device.

9. The non-transitory computer-readable storage medium according to claim 6, wherein said server component and said client reside on separate and remote computing devices.

10. The non-transitory computer-readable storage medium according to claim 6, wherein said client continuously gathers contextual information, the first set of contextual information being from a first period of time and the second set of contextual information being from a second period of time.

11. Non-transitory computer-readable storage medium containing instructions operable to make a determination concerning whether a software application is benign or malicious, said instructions comprising instructions operable to:
    extract metadata about the application;
    gather a first set of contextual information concerning the system to generate a constructed infection history for a client, wherein said first set of contextual information includes recent infection history, applications running on the system, web sites visited, the geographic location of the client, the Internet Protocol (IP) address of the client, and a client identifier;

transmit the metadata and the first set of contextual information to a server component, wherein the metadata and the first set of contextual information are encoded prior to the transmitting;

receive a response from the server component relating to a determination as to whether the application is benign or malicious based on the metadata and the first set of contextual information, wherein said determination as to whether the application is benign or malicious is made by:

examining the metadata and determining that the application is suspicious;

when the application is suspicious and a final determination as to whether the application is benign or malicious cannot be made without analyzing the first set of contextual information, examining the metadata based on the constructed infection history, including analyzing the metadata based on geographic parameters and web site specific parameters determined based on the constructed infection history, to determine whether the application is benign or malicious; and derive a model based on the determination, the model encoding rules to be utilized in making future determinations when a second set of contextual information is similar to the first set of contextual information; and take an action with respect to the application based on the information received from the server component.

12. The non-transitory computer-readable storage medium according to claim 11, wherein said server component and said client reside on the same computing device.

13. The non-transitory computer-readable storage medium according to claim 11, wherein said server component and said client reside on separate and remote computing devices.

14. The non-transitory computer-readable storage medium according to claim 11, wherein said client continuously gathers contextual information, the first set of contextual information being from a first period of time and the second set of contextual information being from a second period of time.

15. Non-transitory computer-readable storage medium containing instructions operable to make a determination concerning whether a software application is benign or malicious, said instructions comprising instructions operable to:

receive metadata about the application and a first set of contextual information concerning the system to generate a constructed infection history for a client, wherein the metadata and the first set of contextual information are encoded prior to being received, and wherein said first set of contextual information includes recent infection history, applications running on the system, web sites visited, the geographic location of the client, the Internet Protocol (IP) address of the client, and a client identifier;

make a determination as to whether the application is benign or malicious by:

examining the metadata and determining that the application is suspicious; and when the application is suspicious and a final determination as to whether the application is benign or malicious cannot be made without analyzing the first set of contextual information, examining the metadata based on the constructed infection history, including analyzing the metadata based on geographic parameters and web site specific parameters determined based on the constructed infection history, to determine whether the application is benign or malicious;

derive a model based on the determination, the model encoding rules to be utilized in making future determinations when a second set of contextual information is similar to the first set of contextual information; and transmit a response to the client containing information relating to the determination.

16. The non-transitory computer-readable storage medium according to claim 15, wherein said metadata is selected from the group consisting of traditional fingerprints and generic signatures.

17. The non-transitory computer-readable storage medium according to claim 15, wherein said client continuously gathers contextual information, the first set of contextual information being from a first period of time and the second set of contextual information being from a second period of time.

18. A computer system configured to determine whether a software application is benign or malicious, comprising:

a first non-transitory computer-readable storage medium containing instructions operable to:

extract metadata about the application;

gather a first set of contextual information concerning the system to generated a constructed infection history for a client, wherein said first set of contextual information includes recent infection history, applications running on the system, web sites visited, the geographic location of the client, the Internet Protocol (IP) address of the client, and a client identifier; and transmit the metadata and the first set of contextual information to a server component, wherein the metadata and the first set of contextual information are encoded prior to being transmitted; and a second non-transitory computer-readable storage medium containing instructions operable to:

make a determination as to whether the application is benign or malicious by:

examining the metadata and determining that the application is suspicious; and when the application is suspicious and a final determination as to whether the application is benign or malicious cannot be made without analyzing the first set of contextual information, examining the metadata based on the constructed infection history, including analyzing the metadata based on geographic parameters and web site specific parameters determined based on the constructed infection history, to determine whether the application is benign or malicious;

derive a model based on the determination, the model encoding rules to be utilized in making future determinations when a second set of contextual information is similar to the first set of contextual information; and transmit a response to the client containing information relating to the determination.

19. The computer system according to claim 18, wherein said extracted metadata is selected from the group consisting of traditional fingerprints and generic signatures.

20. The computer system according to claim 18, wherein said server component and said client reside on the same computing device.

21. The computer system according to claim 18, wherein said server component and said client reside on separate and remote computing devices.

22. The computer system according to claim 18, wherein said client continuously gathers contextual information, the first set of contextual information being from a first period of time and the second set of contextual information being from a second period of time.

23. The non-transitory computer-readable storage medium according to claim 11, wherein said extracted metadata is selected from the group consisting of traditional fingerprints and generic signatures.

\* \* \* \* \*